Aug. 19, 1958     C. PACKWOOD     2,848,027
WALNUT HULLER
Filed Feb. 27, 1956     2 Sheets-Sheet 1
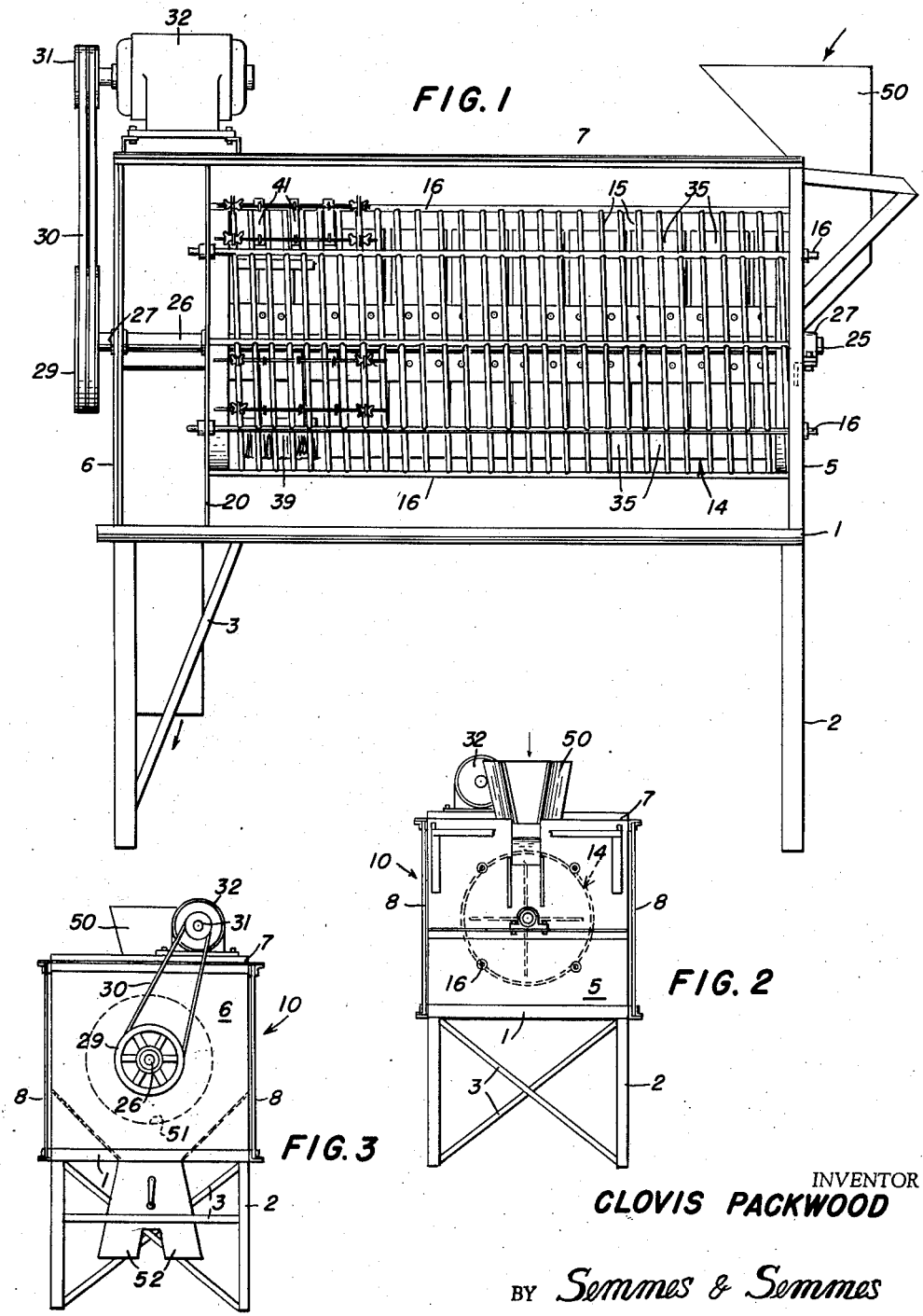
INVENTOR
CLOVIS PACKWOOD
BY *Semmes & Semmes*
ATTORNEYS Aug. 19, 1958 C. PACKWOOD 2,848,027
WALNUT HULLER
Filed Feb. 27, 1956 2 Sheets-Sheet 2
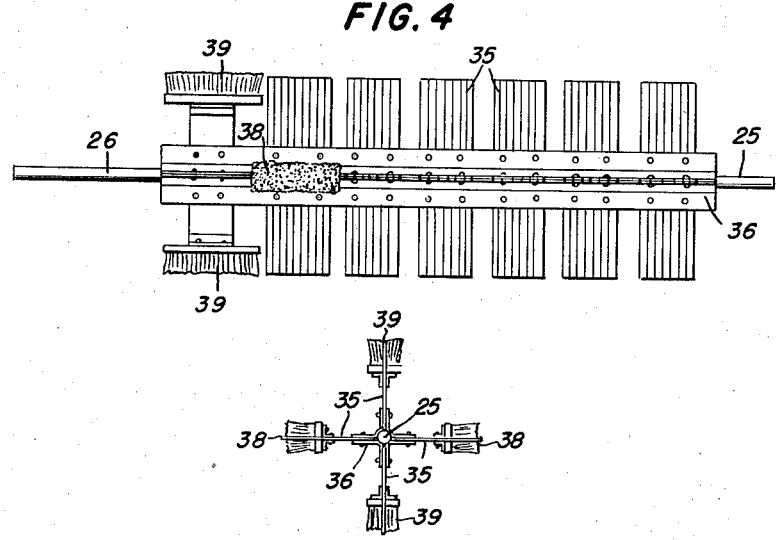
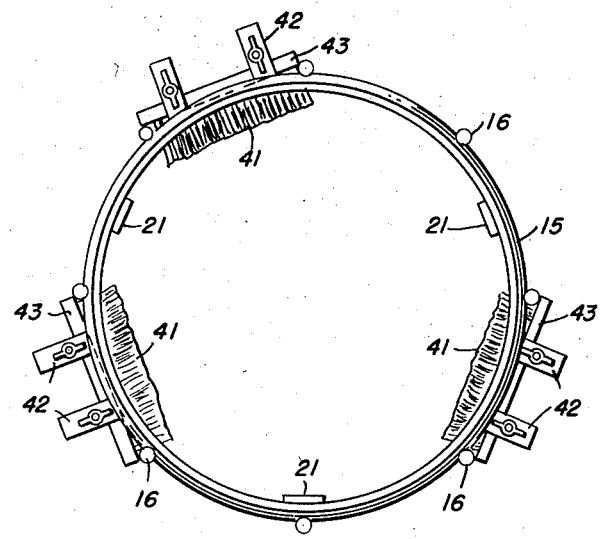
INVENTOR
CLOVIS PACKWOOD
BY Semmes & Semmes
ATTORNEYS

United States Patent Office 2,848,027
Patented Aug. 19, 1958

2,848,027

WALNUT HULLER

Clovis Packwood, Exeter, Mo., assignor of one-half to Jessie M. Ellston, Exeter, Mo.

Application February 27, 1956, Serial No. 567,901

5 Claims. (Cl. 146—8)

The present invention relates to nut hulling apparatus and more particularly to a machine designed to remove cleanly and efficiently the tough outer covering from walnuts including the species, *Juglans nigra*.

A primary object of the present invention is to provide a walnut huller adapted for continuous operation with sufficient capacity and processing speed to enable its employment on a commercial scale.

A second object of my invention is to provide a walnut huller adapted for the continuous processing of ungraded nuts of varying sizes without incessant adjustment of the apparatus.

A further object of the invention is to provide a walnut huller adapted to insure substantially complete removal of the outer covering hull of the nuts with an automatic separation thereof from the cleaned nuts.

A still further object of my invention is to provide a walnut huller which will remove the outer covering hull with a minimum of damage to the inner nut shell.

Other objects and advantages of the invention will be readily apparent from the following detailed description of a preferred embodiment thereof when taken in conjunction with the accompanying drawings, wherein:

Figure 1 is a side elevational view of an apparatus embodying the principles of my invention;

Figure 2 is an elevational view of the input end thereof;

Figure 3 is an elevational view of the discharge end of the apparatus;

Figure 4 is a side elevational view of the beater element employed therein;

Figure 5 is an end view of said beater element; and

Figure 6 is an end elevational view of the cage element showing the relative mountings of the fixed cleansing brushes therein.

Briefly stated, the present invention contemplates nut dehulling through the action of an intermittent flexible pressure exerted angularly upon rolling nuts within a cylindrical cage composed of spirally wound rods, a beater of resilient material serving not only to supply the hull disintegrating pressure but also to transport the nuts continuously through the apparatus.

Turning to the drawings, the dehuller apparatus includes a base 1 formed of spaced parallel bars arranged in the form of a rectangular grating horizontally disposed and carried upon corner legs 2 suitably braced by diagonal and transverse supporting members 3. The base 1 is provided with vertically extending end plates 5 and 6, projecting upwardly therefrom and united at their upper extremities by a top plate 7 which parallels and is substantially co-extensive with the base 1. Side panels 8 are releasably secured between the end plates 5 and 6, slidably engaging in edge grooves provided along the base and top plates from which the panels may be withdrawn to provide access to the apparatus. The base, plates and panels constitute a housing 10 within which the dehulling operation is effected.

Disposed centrally of the housing 10 is a cylindrical cage 14 formed of steel rods 15 spirally wound as a helix, the spatial arrangement being maintained and supported by a plurality of spaced bars 16 peripherally secured thereto. The bars 16 project outwardly beyond the ends of the cage 14 and provide means for attachment of said cage to the end plate 5 and an auxiliary partition 20 spaced inwardly from the end plate 6 and in parallel relation thereto.

A plurality of flat breaker strips 21 of metal are secured to the inner surfaces of the rods 15 and are of a length sufficient to extend substantially completely the entire length of the cage, lying in spaced parallel relation to the supporting rods 16.

A beater 25 is mounted within the cage 14, being supported upon a concentric shaft 26 carried in suitable bearings 27 provided in the end plates 5 and 6. The rear end of the shaft 26 extends beyond the plate 6 and has secured thereon drive pulleys 29 connected by V-belts 30 to pulleys 31 carried at the end of the shaft of a motor 32 mounted upon the top plate 7 and connected to a suitable source of current (not shown).

As best seen in Figure 4, the beater 25 is provided with a series of resilient pressure members 35, preferably formed of heavy cord reinforced rubber sections, crucially secured to the shaft 26 by plate clamps 36 extending along the length thereof. The opposed sections 35 are of a size sufficient to approach within close proximity of the inner surfaces of the rods 15 constituting the cage 14, care being taken that they clear the breaker strips 21 secured thereto. Under ordinary circumstances, the members 35 are spaced less than an inch from the rods 15.

One pair of the penultimate beater elements 35 adjacent the drive end of the shaft 26 is replaced by heavy wire brushes 38 mounted upon rigid supports while the opposite pair of the ultimate beater elements adjacent the drive end of the shaft 26 is composed of fiber brushes 39, also mounted upon rigid supports. The cleaning action of the brushes 38 and 39 may be supplemented by the inclusion of a plurality of wire or fiber brushes 41 within the structure of the cage 14. The brushes 41 of any desired dimension and configuration are carried on slotted strap supports 42 fitted over transverse rods 43 secured to the exterior of the cage 14 in order that the brush position and distance of penetration within the cage 14 may be adjusted for maximum cleaning efficiency and to allow compensation for normal wear.

A feed hopper 50 is positioned adjacent the upper edge of the plate 5 and discharges through a suitable chute into the interior of the cage 14. Walnuts to be processed in my apparatus may be charged into the hopper 50 from bag storage or when a large volume operation is contemplated, a continuous feed supply may be provided.

During the dehulling and cleaning operation the walnuts entering the cage 14 are propelled over a spiral path defined by the rods 15, being subjected to intermittent flexible pressures exerted by the beaters 35 upon constantly changing points on the surface of the moving nuts. Such action results in a separation of the outer hulls from the walnuts, with the hull particles dropping between the rods 15 while the cleaned nuts progress through the cage 14. The brushes 38 and 39 passing over the nut shells will remove any fragments of hull adhering thereto, this cleansing being aided by the brushes 41 and the cleaned nuts are finally discharged from the cage, through an opening 51 provided in the plate 20 communicating with a delivery or bagging chute 52 disposed beneath the area between the rear plate 6 and the partition 20.

Experiments have shown that the intermittently applied flexible pressure possible through the use of resilient beaters 35 results in a cleaner separation of hull from shell than can be obtained by the usual spring pick, hammer or cutter bar arrangement. Rather than creating a sharp impact against the walnut outer hull from which the nut rebounds, there is a rolling pressure urging the nut hull against the rods 15 and a cleavage of the hull. Since the nuts are in constant motion the lines of force tending to disintegrate the hulls are always shifting thereby minimizing damage to the inner shells per se. Additionally, when a partially dehulled nut is admixed with nuts having intact hulls, the flexible pressure of any resilient beater will be less likely to fracture the exposed shell of such nut than a spring pick or hammer.

The flexible pressures of my resilient beater and the greatly elongated path of travel of nuts traversing the apparatus insure complete cleaning of mixed size, ungraded nuts and no adjustment of the apparatus or preclassification of the apparatus is necessary for the satisfactory operation thereof.

Rotation of the nuts along the rods 15 will be interrupted regularly by the breaker bars 21. These impacts will effect a further change in the rotary movement of the nuts, thus presenting different surfaces to the action of the resilient beater. The rods 15 per se can assist in the dehulling action by frictional abrasion of the hulls.

It will be readily apparent that various modifications in the form of the several elements of my apparatus and their arrangement are possible without departing from the spirit of the invention or the scope of the appended claims.

What I claim is:

1. A walnut hulling apparatus comprising a horizontally disposed cylindrical cage formed of spaced rods spirally wound in helical shape, a beater element mounted concentrically within said cage and rotatable with respect thereto, said beater element including spaced resilient members of reinforced rubber material extending to within close proximity of the cage walls and adapted to apply an intermittent, yielding pressure sufficient to disintegrate the hulls of walnuts passing therebetween, and means for rotating said beater element to generate said pressures and to propel the walnuts through the apparatus.

2. A walnut hulling apparatus comprising a horizontally disposed cylindrical cage formed of spaced rods spirally wound in helical shape, the individual windings of the rods being spaced from each other a distance less than the outer dimensions of the inner shell of a walnut, a beater element mounted concentrically within said cage and rotatable with respect thereto, said beater element including spaced resilient members of reinforced rubber material extending to within close proximity of the cage walls and adapted to apply an intermittent, yielding pressure sufficient to disintegrate the hulls of walnuts passing therebetween, a plurality of brushes secured to said beater element in alinement with and subsequent to said resilient members for final cleaning of the hulled walnuts, and means for rotating said beater element to generate said pressures and to propel the walnuts through the apparatus.

3. A walnut hulling apparatus as defined in claim 2, in which auxiliary brush elements are secured exteriorly of and extend inwardly into the cylindrical cage for engagement with the surfaces of walnuts being propelled therethrough.

4. A walnut hulling apparatus as defined in claim 3, in which the resilient members and moving brushes are crucially arranged on said beater element.

5. A walnut hulling apparatus comprising a horizontally disposed cylindrical cage formed of spaced rods spirally wound in helical shape secured against displacement by longitudinal supports peripherally attached thereto and containing a plurality of longitudinal breaker strips regularly spaced around and attached to the inner surface of said cage, a beater element mounted concentrically within said cage and rotatable with respect thereto, said beater element including spaced resilient members of reinforced rubber material extending to within close proximity of the cage walls and adapted to apply an intermittent flexible and yielding pressure against walnuts passing thereunder, such pressure being sufficient to strip the covering hulls from said walnuts and to eject the separated hulls through the walls of the cage with the assistance of the beater rotation, a plurality of brushes secured to said beater element in alinement with and subsequent to said resilient members for final cleaning of the hulled walnuts, and means for rotating said beater element to generate said pressure and to propel the walnuts through the apparatus.

References Cited in the file of this patent

UNITED STATES PATENTS

| | | | |
|---|---|---|---|
| 39,309 | Rowan | July 21, | 1863 |
| 176,142 | Little | Apr. 18, | 1876 |
| 290,914 | Nicholson | Dec. 25, | 1883 |
| 348,890 | Crawford | Sept. 7, | 1886 |
| 486,441 | Empson | Nov. 22, | 1892 |
| 567,372 | Beach | Sept. 8, | 1896 |
| 659,801 | Read | Oct. 16, | 1900 |
| 767,459 | Welch | Aug. 16, | 1904 |
| 1,264,329 | Pike | Apr. 30, | 1918 |
| 1,335,669 | Duke | Mar. 30, | 1920 |
| 2,669,268 | Meyer | Feb. 16, | 1954 |

FOREIGN PATENTS

| | | | |
|---|---|---|---|
| 745,086 | France | Feb. 7, | 1933 |
| 448,139 | Great Britain | June 3, | 1936 |